United States Patent
Ridyard

(10) Patent No.: US 11,415,049 B2
(45) Date of Patent: Aug. 16, 2022

(54) BYPASS DUCT FAIRING INSTALLATION

(71) Applicant: PRATT & WHITNEY CANADA CORP., Longueuil (CA)

(72) Inventor: Philip Ridyard, Mississauga (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 17/126,874

(22) Filed: Dec. 18, 2020

(65) Prior Publication Data

US 2022/0195923 A1     Jun. 23, 2022

(51) Int. Cl.
| | |
|---|---|
| *F02C 7/20* | (2006.01) |
| *F02C 7/057* | (2006.01) |
| *F02C 9/18* | (2006.01) |
| *F02K 3/06* | (2006.01) |
| *F02K 1/06* | (2006.01) |

(52) U.S. Cl.
CPC ............... *F02C 7/057* (2013.01); *F02C 9/18* (2013.01); *F02K 1/06* (2013.01); *F02K 3/06* (2013.01); *F02C 7/20* (2013.01); *F05D 2260/40311* (2013.01)

(58) Field of Classification Search
CPC . F02C 7/20; B64D 29/00; F01D 25/04; F01D 25/246
See application file for complete search history.

(56) References Cited

U.S. PATENT DOCUMENTS

| | | | | |
|---|---|---|---|---|
| 5,224,341 A | * | 7/1993 | Munroe | F02C 7/20 60/226.1 |
| 2008/0279679 A1 | * | 11/2008 | Morrison | F01D 9/042 415/191 |
| 2015/0093249 A1 | | 4/2015 | Lang et al. | |
| 2016/0010497 A1 | * | 1/2016 | Griffiths | B08B 9/00 415/121.3 |
| 2018/0080454 A1 | | 3/2018 | Baumann et al. | |
| 2018/0112679 A1 | | 4/2018 | Amadon et al. | |
| 2021/0348516 A1 | * | 11/2021 | Freeman | F01D 9/044 |

FOREIGN PATENT DOCUMENTS

EP         3708783 A1     9/2020

OTHER PUBLICATIONS

European Patent Office, Communication re extended European search report for European patent application No. 21216157.4, dated May 19, 2022.

\* cited by examiner

*Primary Examiner* — Gerald L Sung
(74) *Attorney, Agent, or Firm* — Norton Rose Fulbright Canada LLP

(57) ABSTRACT

Fairing installations disclosed herein may include a damper for mitigating vibration of a cantilevered fairing disposed in a bypass duct of a gas turbine engine. The bypass duct may include a first shroud radially spaced apart from a second shroud to define a bypass passage between the first and second shrouds. The fairing may be disposed in the bypass passage and cantilevered from the first shroud. The fairing may have a secured end secured to the first shroud and a free end proximate the second shroud. The damper may be engaged with the free end of the fairing to damp movement of the free end of the fairing.

15 Claims, 6 Drawing Sheets

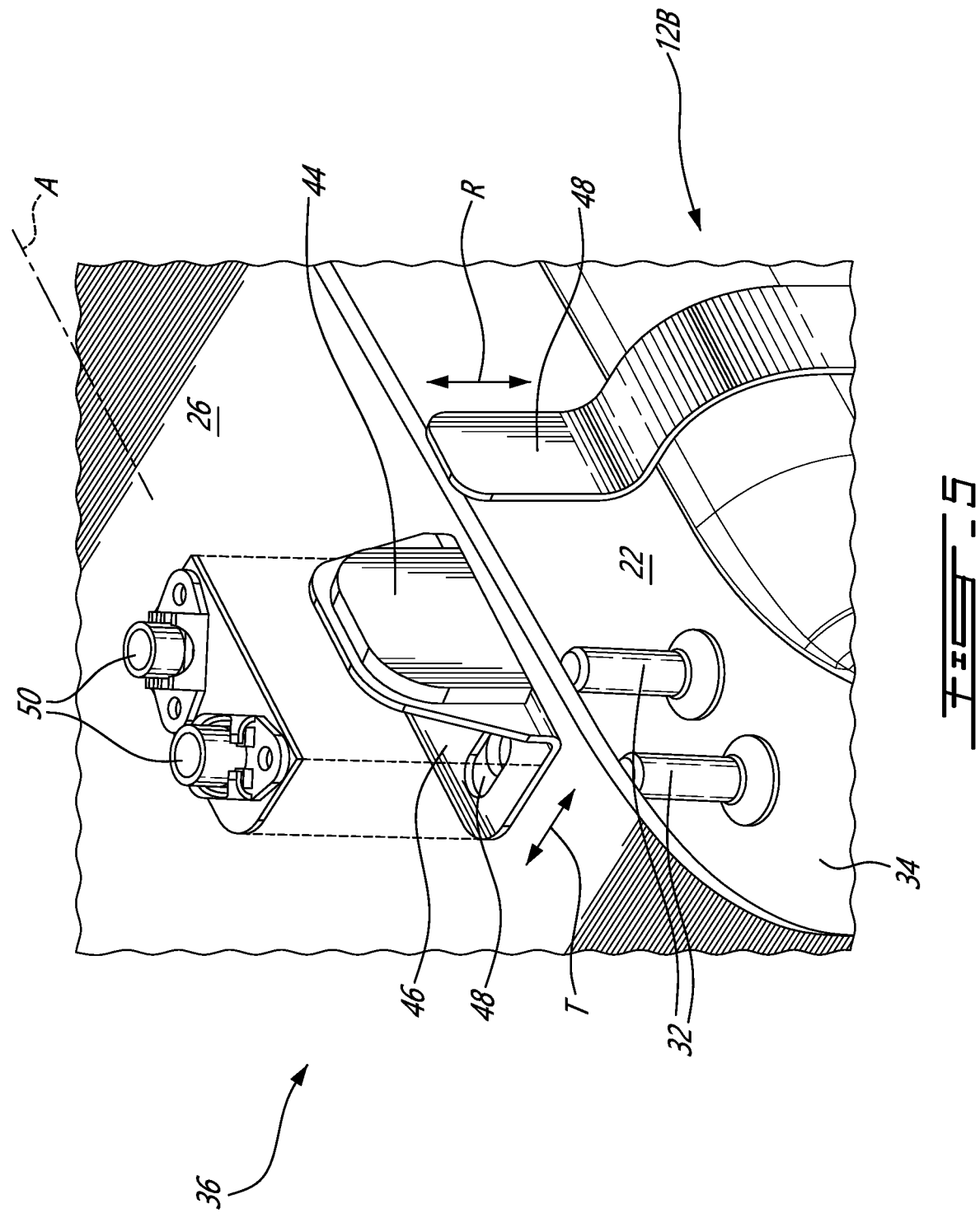

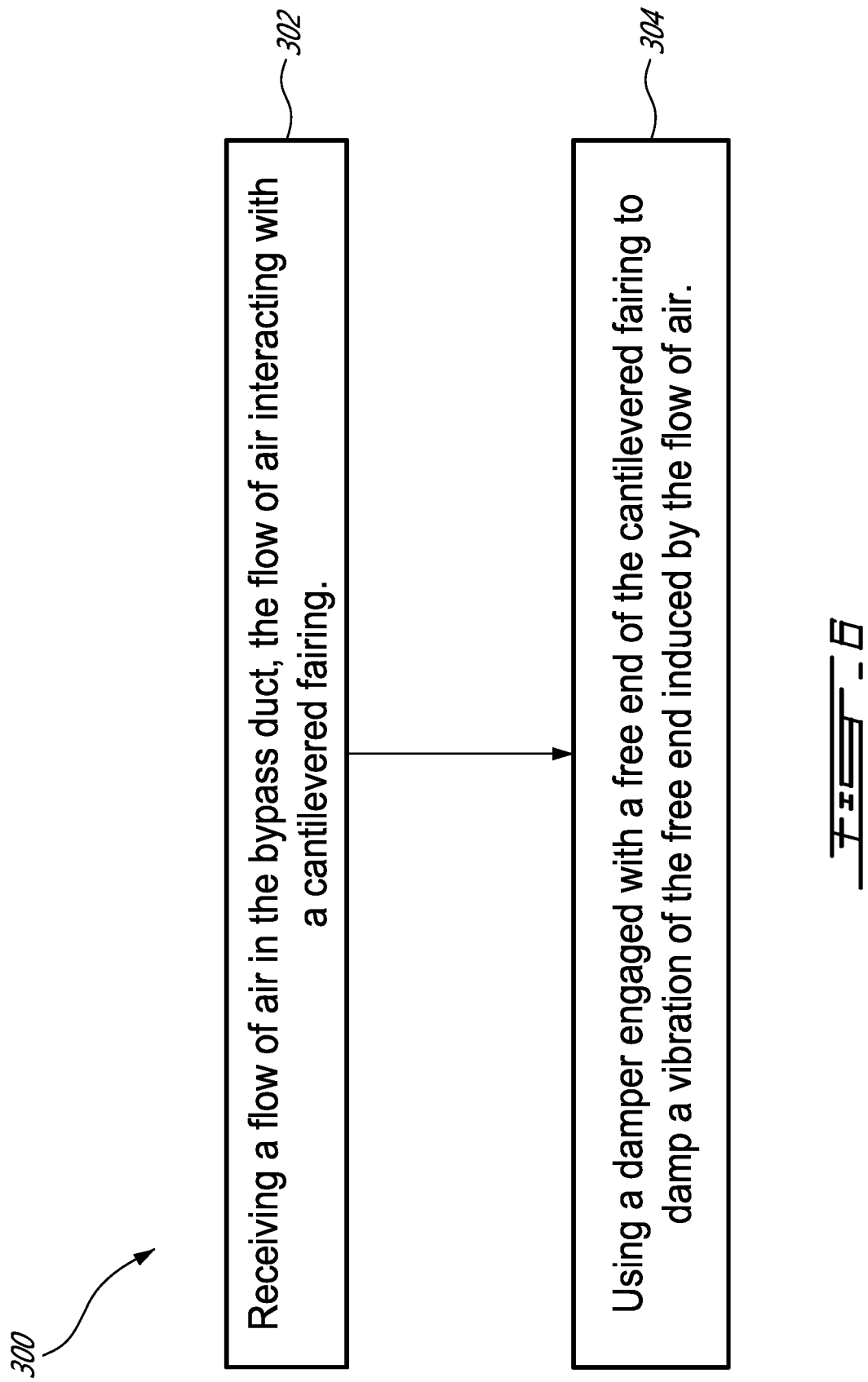

BYPASS DUCT FAIRING INSTALLATION

TECHNICAL FIELD

The disclosure relates generally to gas turbine engines, and more particularly to fairings disposed in bypass ducts of turbofan gas turbine engines.

BACKGROUND

A fairing may be disposed in a bypass duct of a turbofan gas turbine engine to provide an outer aerodynamic shell around a structural strut extending across the bypass duct or around service connections routed through the bypass duct. Fairings are typically designed to have a stiffness sufficiently high to resists static and dynamic loads during operation of the gas turbine engine. As a result, fairings typically have a relatively stiff and heavy construction. Improvement is desirable.

SUMMARY

In one aspect, the disclosure describes a bypass duct of a turbofan gas turbine engine. The bypass duct comprises:

a first shroud extending at least partially around an axis;

a second shroud extending at least partially around the axis, the second shroud being radially spaced apart from the first shroud to define a bypass passage between the first and second shrouds;

a fairing disposed in the bypass passage and extending between the first and second shrouds, the fairing having a first fairing portion secured to the first shroud and a second fairing portion radially opposite the first fairing portion, a gap defined between the second fairing portion and the second shroud accommodates relative movement between the second fairing portion and the second shroud; and a damper engaged with the second fairing portion to damp movement of the second fairing portion.

In another aspect, the disclosure describes a turbofan gas turbine engine comprising:

a fan through which ambient air is propelled;

a core including a compressor for pressurizing a first portion of the air propelled by the fan, a combustor in which the pressurized air is mixed with fuel and ignited for generating an annular stream of hot combustion gases, and a turbine section for extracting energy from the combustion gases; and a bypass duct defining a bypass passage at least partially surrounding the core for conveying a second portion of the air propelled by the fan, the bypass duct including:

a first shroud at least partially extending around an axis;

a second shroud at least partially extending around the axis, the second shroud being radially spaced apart from the first shroud to define the bypass passage between the first and second shrouds;

a fairing disposed in the bypass passage and cantilevered from the first shroud, the fairing having a secured end secured to the first shroud and a free end proximate the second shroud; and a damper engaged with the free end of the fairing to damp movement of the free end of the fairing.

In a further aspect, the disclosure describes a method for mitigating a vibration of a cantilevered service fairing disposed in a bypass duct of a gas turbine engine. The cantilevered service fairing has a secured end and a free end opposite the secured end. The cantilevered service fairing has one or more service connections being routed therethrough. The method comprises:

receiving a flow of air in the bypass duct, the flow of air interacting with the cantilevered service fairing; and using a damper engaged with the free end of the cantilevered service fairing to damp a vibration of the free end of the cantilevered service fairing induced by the flow of air interacting with the cantilevered service fairing.

Further details of these and other aspects of the subject matter of this application will be apparent from the detailed description included below and the drawings.

DESCRIPTION OF THE DRAWINGS

Reference is now made to the accompanying drawings, in which:

FIG. 5 is tridimensional exploded view of an exemplary damper for engagement with the fairing of FIG. 3; and FIG. 6 is a flowchart of a method for mitigating vibration of a fairing disposed in a bypass duct of a turbofan gas turbine engine.

DETAILED DESCRIPTION

The following disclosure describes fairing installations inside bypass ducts of turbofan gas turbines, and associated methods. In some embodiments, the fairing installations described herein may provide improvements to cantilevered service fairings. In some embodiments, a damper may be engaged with a free end of a cantilevered fairing so that vibrations (e.g., fluttering) of the free end of the fairing potentially induced by a flow of fluid (e.g., bypass air) may be damped. In some embodiments, this may reduce vibration amplitudes and permit the use of a smaller gap between the free end of the fairing and a shroud of the bypass duct. In some embodiments, as a result of the damping of the free end, a fairing having a lower stiffness and a lighter construction may be permitted compared to other cantilevered fairing installations devoid of such damping. In some embodiments, the damper may be tuned to provide a desired dynamic response in view of the specific fairing construction and operating conditions/loading to mitigate vibration and reduce the risk of flutter of the free end of the fairing.

The terms "secured to" and "engaged with" may include both direct securement and engagement (in which two elements contact each other) and indirect securement and engagement (in which at least one additional element is located between the two elements). The term "substantially" as used herein may be applied to modify any quantitative representation which could permissibly vary without resulting in a change in the basic function to which it is related.

Aspects of various embodiments are described through reference to the drawings.

Figure 1:
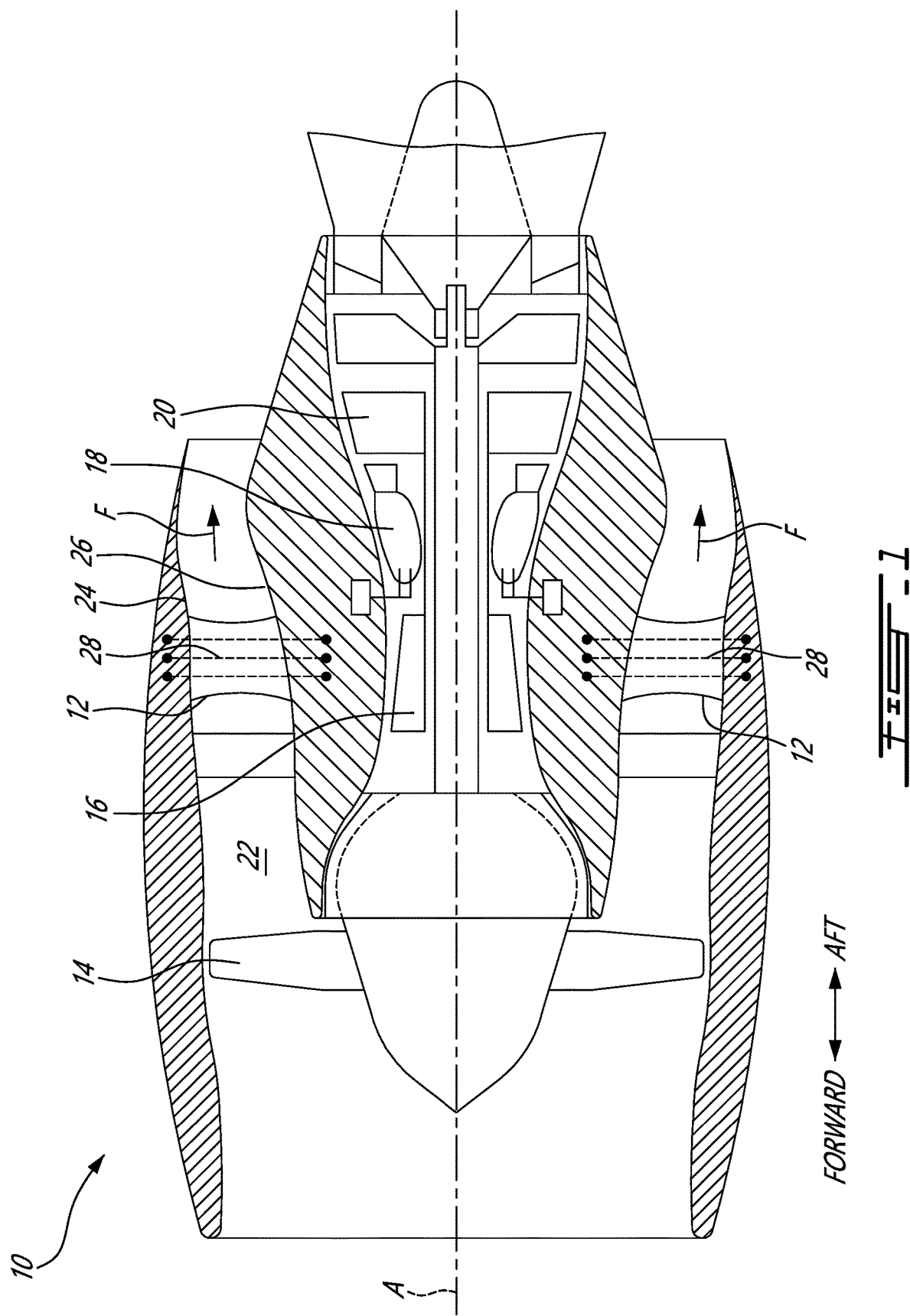
FIG. 1 shows a schematic axial cross-section view of a turbofan gas turbine engine including a fairing installation as described herein.

FIG. 1 shows a schematic axial cross-section view of turbofan gas turbine engine 10 (referred hereinafter as "engine 10") including one or more fairings 12 (referred hereinafter in the singular) as described herein. Engine 10 may be of a type preferably provided for use in subsonic flight, generally comprising in serial flow communication, fan 14 through which ambient air is propelled, multistage compressor 16 for pressurizing the air, combustor 18 in which the compressed air is mixed with fuel and ignited for generating an annular stream of hot combustion gases, and turbine section 20 for extracting energy from the combustion gases. FIG. 1 also shows FORWARD and AFT directions relative to engine 10. The FORWARD direction may correspond to a forward direction of travel of engine 10 when engine 10 is propelling a (e.g., fixed-wing) aircraft.

Compressor 16, combustor 18 and turbine section 20 may be considered part of the core of engine 10. The core may receive core air corresponding to a portion of the ambient air propelled by fan 14. Bypass air corresponding to another portion of the air propelled by fan 14 may be received into bypass duct 22 and conveyed along a passage defined by bypass duct 22. Bypass duct 22 may extend at least partially around the core of engine 10. Bypass duct 22 may be substantially annular about axis A, which may correspond to a centerline of engine 10. For example, axis A may correspond to an axis of rotation of fan 14. Axis A may correspond to an axis of rotation of one or more spools including compressor stage(s) and/or turbine stage(s) of the core of engine 10.

Bypass duct 22 may be defined by radially-outer shroud 24 at least partially extending around axis A, and radially-inner shroud 26 at least partially extending around axis A. Shrouds 24, 26 may be radially spaced apart from each other to define the passage of bypass duct 22 therebetween, through which the bypass air may be conveyed. The flow of bypass air being conveyed through bypass duct 22 is illustrated by arrows F in FIG. 1.

Fairing 12 may be disposed in bypass duct 22. Two or more fairings 12 may be disposed at different angular and/or axial positions inside bypass duct 22. Fairing 12 may extend between radially-outer shroud 24 and radially-inner shroud 26. For example, fairing 12 may extend radially from radially-outer shroud 24 to radially-inner shroud 26 to cover an entire radial distance between radially-outer shroud 24 and radially-inner shroud 26. The term "radially" is intended to encompass orientations that have non-zero radial and axial vector components in relation to axis A and that are not perfectly radial. For example, it is understood that fairing 12 may extend perfectly radially or mainly radially (e.g., inclined relative to the radial direction).

In some embodiments, fairing 12 may be a type of service fairing, sometimes called "service tube fairing" extending radially across bypass duct 22. Accordingly, fairing 12 may permit the routing of one or more service connections 28 therethrough and radially across bypass duct 22. Service connections 28 may include one or more electric connections (e.g., cables, wires), hydraulic lines and/or fuel lines for example. Even though fairing 12 is illustrated herein as a service fairing as a non-limiting example, it is understood that aspects of the present disclosure are also applicable to other types of fairings including strut fairings that may surround a structural strut extending across bypass duct 22.

Figure 2:
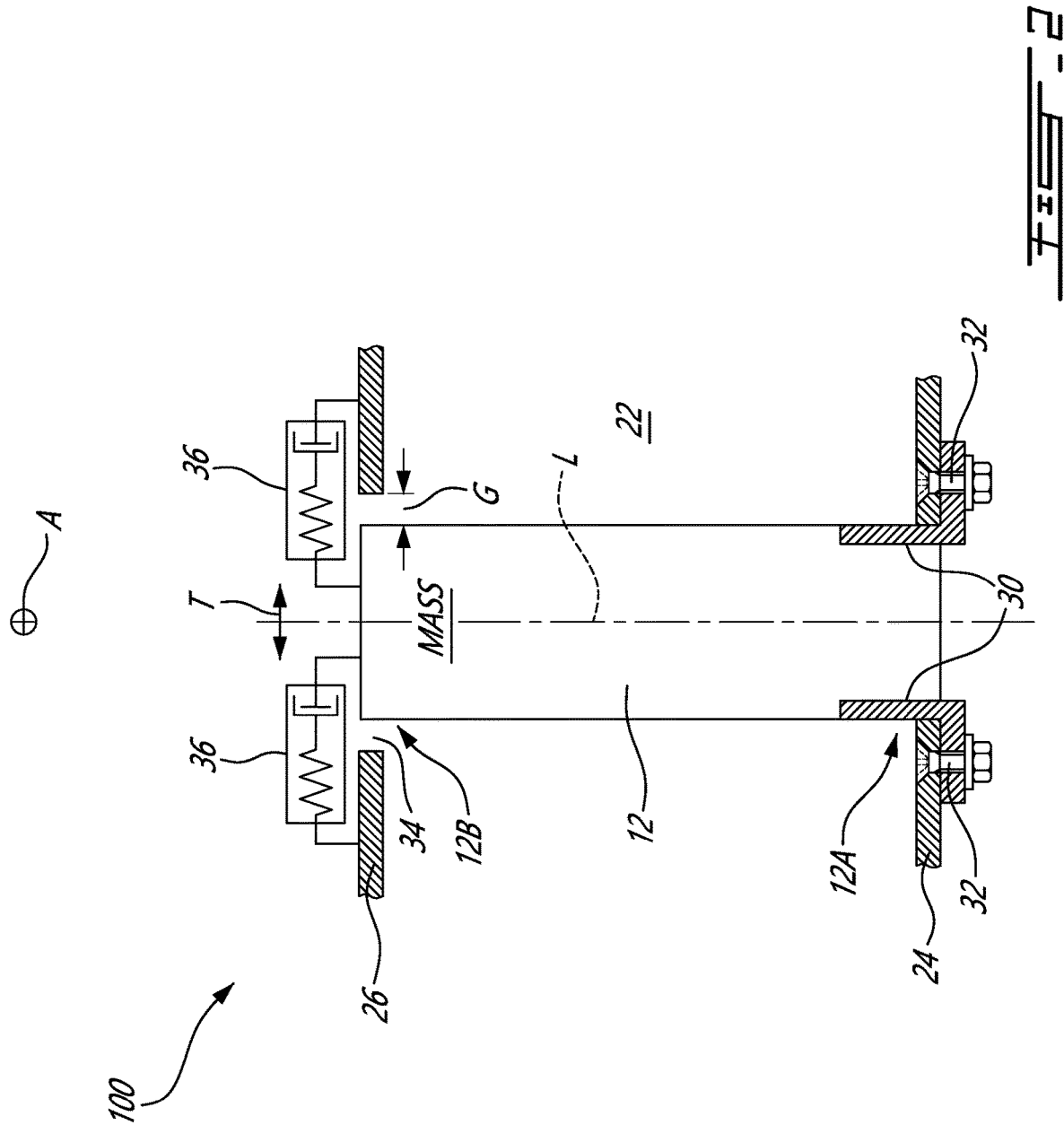
FIG. 2 is a schematic front view of an exemplary fairing installation in a bypass duct of the engine of FIG. 1 viewed in an aft direction along a central axis of the engine of FIG. 1.

FIG. 2 is a schematic representation of fairing installation 100 including fairing 12 installed in bypass duct 22 of engine 10. The vantage point in FIG. 2 is substantially along axis A looking in the AFT direction of FIG. 1 so that axis A is substantially perpendicular to the page of FIG. 2. In some embodiments, fairing 12 may be cantilevered from radially-outer shroud 24 as illustrated in FIG. 2 but is it understood that fairing 12 could instead be cantilevered from radially-inner shroud 26. In the non-limiting example shown in FIG. 2, fairing 12 may have secured portion 12A (e.g., secured end) secured to radially-outer shroud 24, and radially-opposite free portion 12B (e.g., free end) proximate radially-inner shroud 26 and/or extending through aperture 34 formed in radially-inner shroud 26.

Secured portion 12A may be rigidly secured to radially-outer shroud 24 and/or to other structure in a cantilevered manner so that at least a majority, or substantially all of the structural support for fairing 12 is provided via the securement of secured portion 12A to radially-outer shroud 24 and/or to the other structure. In other words, a principal load path between fairing 12 and outer shroud 24 and/or other structure may include the interface of secured portion 12A with outer shroud 24 and/or the other structure. In some embodiments, the principal load path may be the sole load path supporting fairing 12.

In some embodiments, damper 36 may provide a physical interconnection between free portion 12B of fairing 12 and radially-inner shroud 26 and/or to other structure. However, such interconnection may provide either no significant structural support, or significantly less structural support for fairing 12 than the securement of secured portion 12A. In other words, free portion 12B may be relatively unsecured compared to secured portion 12A. Accordingly, fairing 12 may be considered to be cantilevered from radially-outer shroud 24 and/or other structure at secured portion 12A.

In some embodiments, secured portion 12A of fairing 12 may include one or more braces 30 that are (e.g., directly) secured (e.g., fastened) to radially-outer shroud 24 and/or other structure via one or more fasteners 32 (e.g., bolts, machine screws) for example. Braces 30 may be secured to or part of an internal framework supporting shell elements of fairing 12 as explained below. Other securing means including rivets and/or welds may be used to secure secured portion 12A to radially-outer shroud 24 and/or to the other structure. In various embodiments, secured portion 12A may be secured directly to radially-outer shroud 24. Alternatively or in addition, secured portion 12A may extend through an aperture formed through radially-outer shroud 24 and be secure to a structure other than radially-outer shroud 24 and disposed radially outwardly of radially-outer shroud 24.

Free portion 12B of fairing 12 may be disposed proximate to radially-inner shroud 26. Radially-inner shroud 26 may be a relatively thin and lightweight shell structure. Free portion 12B may extend into aperture 34 formed in radially-inner shroud 26. Aperture 34 may be larger than free portion 12B to provide gap G between free portion 12B and radially-inner shroud 26. Gap G may be empty space providing positional clearance to accommodate assembly tolerances and relative movement between free portion 12B and radially-inner shroud 26. Gap G may extend partially or completely around free portion 12B of fairing 12. Gap G may provide a clearance to accommodate relative movement between free portion 12B and radially-inner shroud 26 in the axial direction relative to axis A, in the radial direction relative to axis A, and/or in the tangential direction T relative to secured portion (end) 12A of fairing 12. Gap G may also allow for some leakage of bypass air out of bypass duct 22 and it may be desirable to have a smaller gap G to avoid excessive leakage of bypass air. In some embodiments, aspects of the present disclosure may facilitate the use of a smaller gap G.

One or more dampers 36 (referred hereinafter in the singular) may be engaged with free portion 12B of fairing 12 to damp movement (e.g., vibration) of free portion 12B of fairing 12. In some embodiments, the use of damper 36 may reduce the risk of flutter of fairing 12. Fairing 12 may have longitudinal axis L that extends between secured portion 12A and free portion 12B of fairing 12. In some embodiments, longitudinal axis L may extend radially relative to axis A. During operation, vibratory motion of free portion 12B may be induced by the flow F of bypass air. In some embodiments, at least some (e.g., a majority) of the vibratory motion may be generally tangential to secured portion 12A of fairing 12 as indicated by arrow T in FIG. 2. For example, the vibratory motion may be rotational motion about a point within secured portion 12A. In some situations, the tangential direction T may be generally lateral relative to axis A. In some embodiments, the tangential direction T may be generally lateral relative to longitudinal axis L of fairing 12. The magnitude and frequency of the vibratory motion may be dependent upon the stiffness of fairing 12.

In some embodiments, the use of damper 36 may reduce movement amplitudes of free portion 12B and thereby facilitate the use of a relatively small gap G. In some embodiments, the use of damper 36 may also permit lower stiffness requirements for the construction of fairing 12 and consequently permit a more weight-efficient construction of fairing 12. As explained below, structural parameters of damper 36 may be selected (i.e., tuned) to provide a desired dynamic response based on the structural construction of fairing 12 and the operating conditions.

Damper 36 may be configured to define a (e.g., tunable) mass-spring-damper system between two masses including fairing 12 or part thereof, and radially-inner shroud 26 or part thereof. In some embodiments, radially-inner shroud 26 may be considered a fixed structure and free portion 12B of fairing 12 may be considered a mass movable relative to radially-inner shroud 26. Alternatively, radially-inner shroud 26 and fairing 12 may be considered two masses movable relative to each other.

Figure 3:
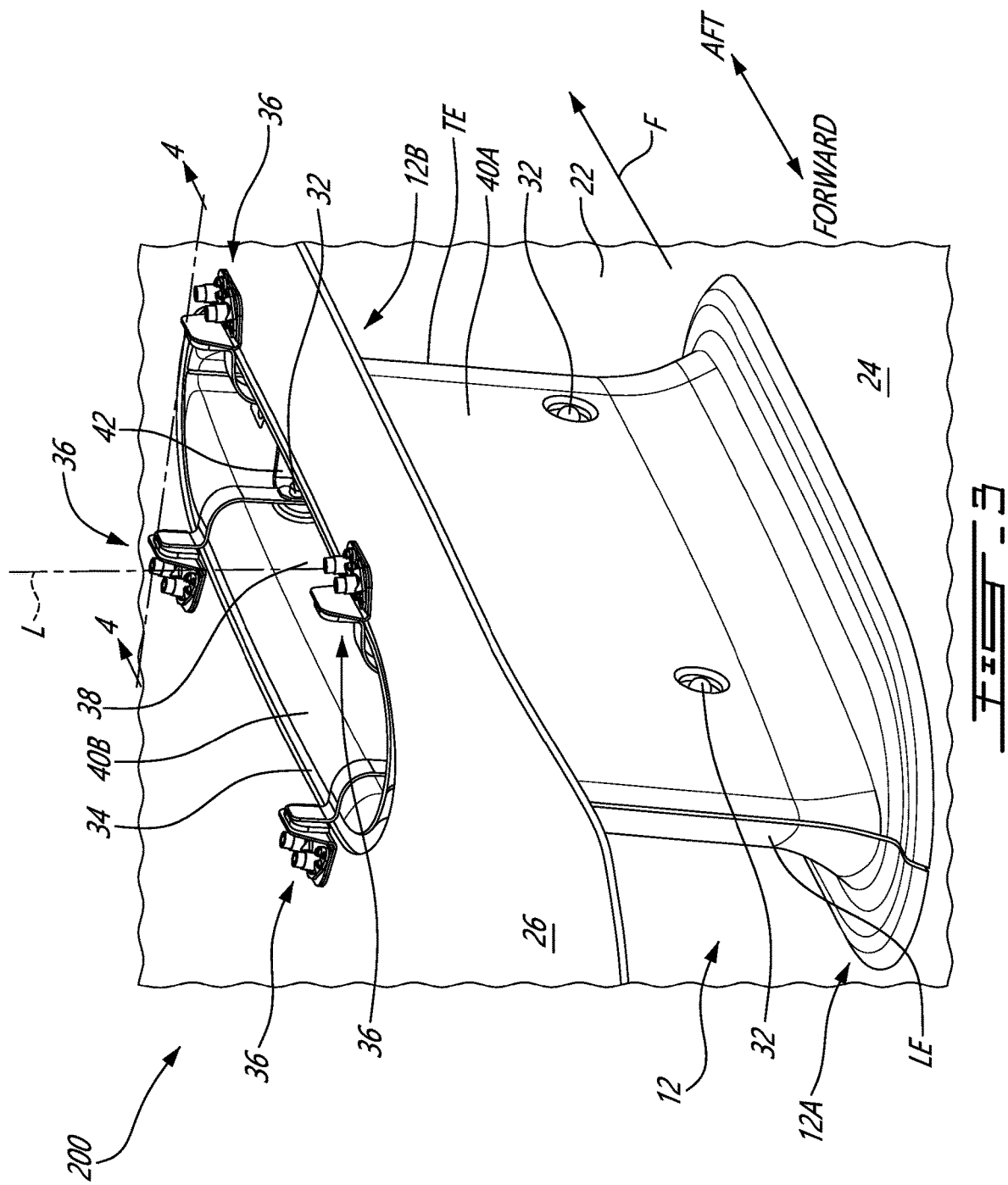
FIG. 3 is a tridimensional view of another exemplary fairing installation in the bypass duct of the engine of FIG. 1.

In some embodiments, damper 36 may include one or more spring elements and one or more damping elements. The spring and damping elements may be connected in series as shown in FIG. 3. Alternatively, the spring and damping elements may be disposed in parallel. Damper 36 may interconnect free portion 12B of fairing 12 with radially-inner shroud 26 and/or interconnect free portion 12B with structure other than radially-inner shroud 26 within engine 10. Damper 36 may be configured to damp movement of free portion 12B generally along the tangential direction T. For example, spring and damping elements of damper 36 may be tuned to mitigate potential mechanical and/or aerodynamic excitations of fairing 12. In some embodiments, damper 36 may leave axial and/or radial movement of free portion 12B substantially unconstrained.

FIG. 3 is a tridimensional view of another exemplary fairing installation 200 including fairing 12 installed in bypass duct 22 of engine 10. Fairing installation 200 may include elements described above in relation to fairing installation 100. Like elements are identified using like reference numerals. Fairing 12 may defines a through internal passage 38 that permits service connections 28 to be routed longitudinally through fairing 12 and radially across bypass duct 22. Fairing 12 may have leading (i.e., upstream) end LE relative to the flow F of bypass air, and trailing (i.e., downstream) end TE relative to the flow F of bypass air.

Fairing 12 may include an assembly of parts. For example, fairing 12 may include one or more outer shell elements 40A, 40B supported by internal frame 42. Shell elements 40A, 40B may define an aerodynamic outer skin of fairing 12. In some embodiments, shell elements 40A, 40B may, for example, be made (e.g., stamped) from a metallic material, or may be molded from a fibre-reinforce composite material. Shell elements 40A, 40B may be laterally opposed relative to axis A. Shell elements 40A, 40B may be (e.g., releasably) secured to frame 42. For example, shell elements 40A, 40B may be fastened to frame 42 using fasteners 32, rivets and/or secured to frame 42 by welding in various embodiments.

In some embodiments, fairing installation 200 may include two laterally-opposed dampers 36. In some embodiments, fairing installation 200 may include two pairs of laterally-opposed dampers 36. In some embodiments, one or more (e.g., forward) dampers 36 may be axially spaced apart from one or more (e.g., aft) dampers 36.

Figure 4:
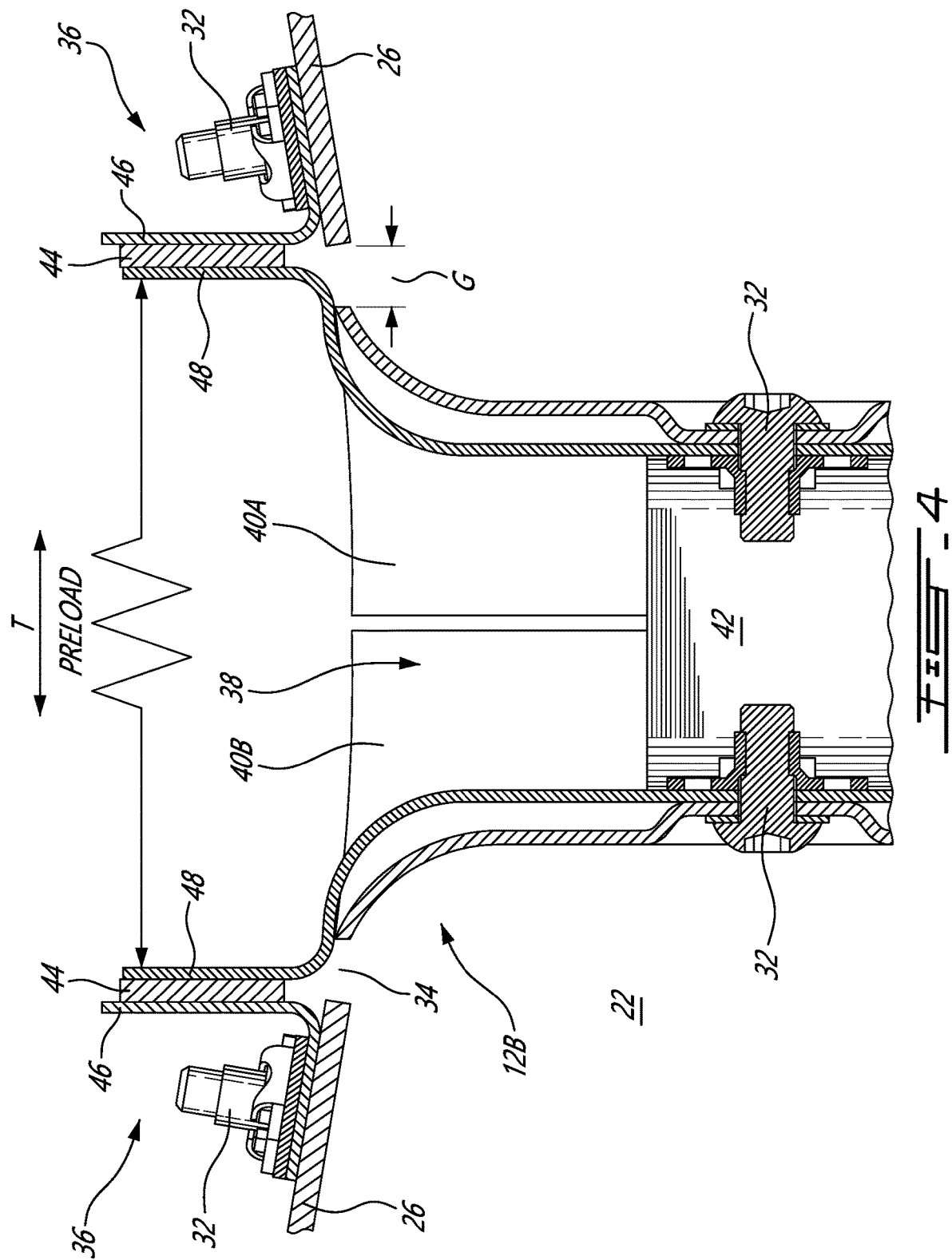
FIG. 4 is a partial cross-sectional view of the fairing of FIG. 3 taken along line 4-4 in FIG. 3.

FIG. 4 is a partial cross-sectional view of fairing 12 taken along line 4-4 in FIG. 3. Damper 36 may be defined by any suitable components providing the desired damping and spring properties. In some embodiments, damper 36 may include one or more compressible (e.g., polymeric, elastomeric) member 44 operatively disposed between frame 42 of fairing 12 and bracket 46 secured to radially-inner shroud 26 via fasteners 32. For example, compressible member 44 may be made of an elastomer such as (e.g., silicone) rubber. Geometric parameters (e.g., size, shape, thickness) and mechanical properties (e.g., Young's modulus, damping coefficient) of compressible member 44 may be selected to provide a desired dynamic response.

Frame 42 may include laterally-opposed arms 48 each defining a cantilevered spring for interfacing with compressible member 44. Geometric parameters (e.g., size, shape, thickness) and mechanical properties (e.g., Young's modulus, damping coefficient) of arms 48 may be selected to provide a desired dynamic response in cooperation with compressible member 44.

In some embodiments, L-shaped brackets 46 may be also each define a cantilevered spring for interfacing with a side of compressible member 44 opposite of arms 48. Geometric parameters (e.g., size, shape, thickness) and mechanical properties (e.g., Young's modulus, damping coefficient) of brackets 46 may be selected to provide a desired dynamic response in cooperation with compressible member 44 and arms 48. In some embodiments, compressible member 44 may be secured to either one of bracket 46 or arm 48 using a suitable adhesive or fastener, and a sliding interface/joint may be provided between compressible member 44 and the other one of bracket 46 or arm 48.

In some embodiments, a compressive preload may be applied to compressible member 44 during assembly of fairing installation 200. Such preload may be applied by having arm 48 and bracket 46 have respective resting shapes that result in arm 48 and bracket 46 being resiliently biased toward each other after assembly of compressible member 44 therebetween. Frame 42 and bracket 46 may be made from a metallic or a fiber-reinforced composite material. In some embodiments, frame 42 and bracket 46 may be made using suitable sheet metal forming technique(s) such as stamping, bending and cutting for example.

FIG. 5 is an enlarged tridimensional exploded view of damper 36 for engagement with fairing 12. Bracket 46 may be secured to radially-inner shroud 26 via one or more fasteners 32 which may be bolts or machine screws. Fasteners 32 may be inserted from inside of bypass duct 22 through holes formed in radially-inner shroud 26. Fasteners 32 may also extend through holes 49 formed in bracket 46 and be threadably engaged with respective (e.g., lock) nuts 50 disposed radially outside of radially-inner shroud 26.

Holes 49 may be slotted (elongated) to permit (e.g., lateral, tangential) positional adjustment of bracket 46 relative to radially-inner shroud 26 along arrow T. Such positional adjustment may be used to locate (e.g., center) free portion 12B of fairing 12 in aperture 34 formed in radially-inner shroud 26 when free portion 12B extends through aperture 34. The positional adjustment may also be used to adjust the compressive pre-load on compressible member 44 by adjusting a flexure of arm 48.

Compressible member 44 may be secured to bracket 46. Arm 48 may be pressed against and in sliding engagement with compressible member 44 so that the damping function of damper 36 may be mainly exerted along arrow T and substantially perpendicular to the surface of compressible member 44 facing arm 48. In some embodiments, compressible member 44 may have the shape of substantially flat block, pad or sheet. In various embodiments, compressible member 44 may have a uniform or non-uniform thickness. Interfacing surfaces of bracket 46 and compressible member 44 may be substantially planar. Interfacing surfaces of arm 48 and compressible member 44 may be substantially planar. The configuration of damper 36 may provide a sliding interface permitting sliding of arm 48 relative to compressible member 44 substantially axially (along axis A) and also radially along arrow R. Accordingly, the configuration of damper 36 may permit relative axial and/or radial movement between radially-inner shroud 26 and free portion 12B of fairing 12. Such configuration of damper 36 may permit radial and axial movement to accommodate assembly-related and/or thermal-related displacement of fairing 12 while providing the tangential support required for damping.

The engagement between arm 48 and compressible member 44 may provide frictional resistance to sliding movement in the axial direction and radial direction R. Such frictional resistance may provide some frictional damping of motion of free end 12B in the axial direction and radial direction R. In other words, damper 36 may function as a frictional damper in the axial direction and radial direction R.

Alternatively or in addition to the configuration shown in FIG. 5, one or more dampers 36 may be arranged so that the sliding interface between member 44 and arm 48 is oriented to be generally parallel to tangential direction T (e.g., generally perpendicular to the orientation shown in FIG. 5). In such embodiments, damper 36 may function mainly as a friction damper where the frictional resistance at the sliding interface provides damping of relative movement in direction T. In such embodiments, materials and surface finishes of the interfacing components in damper 36 may be selected to provide a desired coefficient of friction at the sliding interface, and the preload may be selected in combination with the coefficient of friction to provide a desired resistance to sliding movement. In such embodiments of damper 36, the damping function may be provided by way of frictional resistance at the sliding interface instead of, or in addition to, the compression of member 44.

Tuning of the properties (e.g., damping coefficient, spring stiffness, resonant frequency, damping ratio) of damper 36 may be performed by numerical simulation/modelling, and/or may be performed empirically. The specific configuration of damper 36 illustrated herein is provided as a non-limiting example. It is understood that other types of damping and spring elements may be used.

FIG. 6 is a flowchart of a method 300 for mitigating vibration of fairing 12 disposed in bypass duct 22 of engine 10. Method 300 may be performed using fairing installations 100 or 200 described herein, or using other fairing installations. During operation of engine 10, the flow of bypass air in bypass duct 22 may interact with fairing 12 and could potentially induced an aerodynamic excitation of fairing 12 in the tangential direction T. Other sources of vibration within engine 10 could also induce vibration of fairing 12. In cases where fairing 12 has a cantilevered installation, it may be desirable to damp such vibration(s) of fairing 12 using one or more dampers 36 engaged with free portion 12B of fairing 12.

It is understood that aspects of method 300 may be combined with aspects of other methods/steps and/or aspects of fairing installations 100, 200 described herein. In various embodiments, method 100 may include: receiving a flow of bypass air in bypass duct 22 (block 302); and using one or more dampers 36 engaged with free portion 12B of fairing 12, damping the vibration of free portion 12B of fairing 12 induced by the flow of bypass air.

Method 300 may include damping movement of free portion 12B of fairing 12 in a tangential direction (see arrow T in FIG. 2) relative to secured portion 12A. When damping the vibration of free portion 12B of fairing 12, method 300 may permit axial and radial movement of free portion 12B of fairing 12 relative to central axis A via the sliding interface of damper 36 illustrated in FIG. 5.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

What is claimed is:

1. A bypass duct of a turbofan gas turbine engine, the bypass duct comprising:
   a first shroud extending at least partially around an axis;
   a second shroud extending at least partially around the axis, the second shroud being radially spaced apart from the first shroud to define a bypass passage between the first and second shrouds;
   a fairing disposed in the bypass passage and extending between the first and second shrouds, the fairing having a first fairing portion secured to the first shroud and a second fairing portion radially opposite the first fairing portion, a gap defined between the second fairing portion and the second shroud accommodates relative movement between the second fairing portion and the second shroud; and
   a damper engaged with the second fairing portion to damp movement of the second fairing portion;
   wherein:
      the fairing includes one or more outer shell elements supported by a frame;
      the frame includes an arm defining a cantilever spring; and
      the damper includes a polymeric pad operatively disposed between the arm and a bracket secured to the second shroud.

2. The bypass duct as defined in claim 1, wherein the damper interconnects the second fairing portion with the second shroud.

3. The bypass duct as defined in claim 1, wherein the damper is configured to damp movement of the second fairing portion in a lateral direction relative to the axis.

4. The bypass duct as defined in claim 3, wherein the damper permits relative movement between the second fairing portion and the second shroud along an axial direction relative to the axis.

5. The bypass duct as defined in claim 1, wherein the damper permits relative movement between the second fairing portion and the second shroud along a radial direction relative to the axis.

6. The bypass duct as defined in claim 1, wherein a compressive preload is applied to the polymeric pad.

7. The bypass duct as defined in claim 1, comprising a sliding interface permitting relative translation between the second fairing portion and the second shroud axially and radially relative to the axis.

8. The bypass duct as defined in claim 1, wherein:
the fairing defines a through internal fairing passage; and
one or more service connections are routed through the through internal fairing passage.

9. The bypass duct as defined in claim 1, wherein the arm and the bracket exert a compressive preload on the polymeric pad.

10. The bypass duct as defined in claim 1, wherein the first shroud is disposed radially outwardly of the second shroud.

11. A turbofan gas turbine engine comprising:
a fan through which ambient air is propelled;
a core including a compressor for pressurizing a first portion of the air propelled by the fan, a combustor in which the pressurized air is mixed with fuel and ignited for generating an annular stream of hot combustion gases, and a turbine section for extracting energy from the combustion gases; and
a bypass duct defining a bypass passage at least partially surrounding the core for conveying a second portion of the air propelled by the fan, the bypass duct including:
a first shroud at least partially extending around an axis;
a second shroud at least partially extending around the axis, the second shroud being radially spaced apart from the first shroud to define the bypass passage between the first and second shrouds;
a fairing disposed in the bypass passage and cantilevered from the first shroud, the fairing having a secured end secured to the first shroud and a free end proximate the second shroud; and
a damper engaged with the free end of the fairing to damp movement of the free end of the fairing;
wherein:
the fairing includes one or more outer shell elements supported by a frame;
the frame includes an arm defining a cantilever spring; and
the damper includes an elastomeric pad operatively disposed between the arm and a bracket secured to the second shroud.

12. The turbofan engine as defined in claim 11, wherein:
the damper is configured to damp movement of the second fairing portion in a tangential direction relative to the secured end of the fairing; and
the damper defines a sliding interface permitting axial and radial movement of the free end of the fairing.

13. The turbofan engine as defined in claim 11, wherein:
the fairing defines a through internal fairing passage; and
one or more service connections are routed through the through internal fairing passage.

14. A method for mitigating a vibration of a cantilevered service fairing disposed in a bypass duct of a gas turbine, the bypass duct comprising: a first shroud extending at least partially around an axis; a second shroud extending at least partially around the axis, the second shroud being radially spaced apart from the first shroud to define a bypass passage between the first and second shrouds; the cantilevered service fairing disposed in the bypass passage and extending between the first and second shrouds, the cantilevered service fairing having a first fairing portion secured to the first shroud and a second fairing portion radially opposite the first fairing portion, a gap defined between the second fairing portion and the second shroud accommodates relative movement between the second fairing portion and the second shroud; and a damper engaged with the second fairing portion to damp movement of the second fairing portion; wherein the cantilevered service fairing includes one or more outer shell elements supported by a frame; the frame includes an arm defining a cantilever spring; and the damper includes a polymeric pad operatively disposed between the arm and a bracket secured to the second shroud; the cantilevered service fairing having one or more service connections being routed therethrough; the method comprising: receiving a flow of air in the bypass duct, the flow of air interacting with the cantilevered service fairing; and using the damper engaged with the second fairing portion of the cantilevered service fairing to damp a vibration of the second fairing portion of the cantilevered service fairing induced by the flow of air interacting with the cantilevered service fairing.

15. The method as defined in claim 14, comprising: damping movement of the second fairing portion of the cantilevered service fairing in a tangential direction relative to the first fairing portion of the cantilevered service fairing; and when damping the vibration of the second fairing portion of the cantilevered service fairing, permitting axial and radial translation of the second fairing portion of the cantilevered service fairing relative to the axis.

* * * * *